UNITED STATES PATENT OFFICE.

EARLE E. SCHUMACHER, OF EAST ORANGE, NEW JERSEY, ASSIGNOR TO WESTERN ELECTRIC COMPANY, INCORPORATED, OF NEW YORK, N. Y., A CORPORATION OF NEW YORK.

PLASTIC COMPOSITION.

1,422,483.   Specification of Letters Patent.   Patented July 11, 1922.

No Drawing.   Application filed November 30, 1920.   Serial No. 427,395.

*To all whom it may concern:*

Be it known that I, EARLE E. SCHUMACHER, a citizen of the United States, residing at East Orange, in the county of Essex and State of New Jersey, have invented certain new and useful Improvements in Plastic Compositions, of which the following is a full, clear, concise, and exact description.

This invention relates to a plastic composition which is suitable for use as a binder, molding material and the like.

The mixture of plaster of Paris and water which is commonly employed both as a binder and molding material possesses two fundamental characteristics which prevent its use for certain kinds of work. It is well-known that after the two substances herein above mentioned have been mixed, a rather rapid setting takes place. This necessitates exceedingly quick work on the part of the operator in order to place the mixture in the desired position before the solidification has reached that point where further manipulation destroys its setting power. Further, when the composition is to be used as a binder and the surfaces to be brought into engagement are exceedingly smooth, for example, when glass surfaces are those in question, it has heretofore been known that but little adherence of the composition to the surface can be realized.

It is the purpose of the present invention to provide a composition of matter containing plaster of Paris which may be slow in setting and which will adhere closely to smooth surfaces.

Glycerin when incorporated with plaster of Paris and water has been found to overcome the defects stated above, and moreover, does not in any way impair the usefulness of the plaster of Paris as a binder or molding material. More specifically, a mixture of ten parts of plaster of Paris, one and one-half parts of water, and four parts of glycerin, is well suited for attaching bases to evacuated glass vessels.

The above preparations may be varied in accordance with the particular problem presented. Where it is desired to retard the setting of the mixture for a longer interval, the glycerin content may be increased. It may be that the glycerin at hand is not chemically pure, but is rather an aqueous solution of glycerin: in this case the proportion of the materials should be determined by experimentation.

What is claimed is:

A plastic composition of approximately the following composition:

Glycerin—4 parts.
Plaster of Paris—10 parts.
Water—1½ parts.

In witness whereof, I hereunto subscribe my name this 19th day of November A. D., 1920.

EARLE E. SCHUMACHER.